United States Patent
Park

(10) Patent No.: US 11,342,811 B2
(45) Date of Patent: May 24, 2022

(54) DIESEL GENERATOR WITH IMPROVED LOAD CAPACITY

(71) Applicant: Gi-Bong Park, Gimpo-si (KR)

(72) Inventor: Gi-Bong Park, Gimpo-si (KR)

( * ) Notice: Subject to any disclaimer, the term of this patent is extended or adjusted under 35 U.S.C. 154(b) by 0 days.

(21) Appl. No.: 17/090,272

(22) Filed: Nov. 5, 2020

(65) Prior Publication Data

US 2021/0135542 A1 May 6, 2021

(30) Foreign Application Priority Data

Nov. 6, 2019 (KR) .......................... 10-2019-0140774

(51) Int. Cl.
| | |
|---|---|
| *H02K 7/18* | (2006.01) |
| *F01B 23/10* | (2006.01) |
| *F02B 63/04* | (2006.01) |
| *F02N 11/08* | (2006.01) |
| *H02K 11/00* | (2016.01) |
| *H02K 19/36* | (2006.01) |

(52) U.S. Cl.
CPC ........... *H02K 7/1815* (2013.01); *F01B 23/10* (2013.01); *F02B 63/042* (2013.01); *F02N 11/0862* (2013.01); *H02K 11/0094* (2013.01); *H02K 19/365* (2013.01)

(58) Field of Classification Search
CPC .............. H02K 7/1815; H02K 11/0094; H02K 19/365; F01B 23/10; F02B 63/042; F02N 11/0862
See application file for complete search history.

(56) References Cited

U.S. PATENT DOCUMENTS

| | | | | |
|---|---|---|---|---|
| 2012/0098261 A1* | 4/2012 | Rozman | ................ | F02N 11/006 290/31 |
| 2015/0333601 A1* | 11/2015 | Halicek | .................. | H02K 11/20 322/99 |
| 2018/0142630 A1* | 5/2018 | Boggs | ................. | F02D 41/0245 |

FOREIGN PATENT DOCUMENTS

| | | |
|---|---|---|
| JP | 2-266882 A | 10/1990 |
| JP | 9-65508 A | 3/1997 |
| JP | 2009-168002 A | 7/2009 |
| KR | 10-1623048 B1 | 5/2016 |
| KR | 10-1670811 B1 | 10/2016 |
| KR | 10-1737510 B1 | 5/2017 |
| KR | 10-1817646 B1 | 1/2018 |

* cited by examiner

*Primary Examiner* — Sean Gugger
(74) *Attorney, Agent, or Firm* — Lewis Roca Rothgerber Christie LLP

(57) ABSTRACT

A diesel generator with an improved load capacity according to one embodiment may include a generator body including a field magnet and an armature, and configured to convert rotational energy of a diesel engine main body into electric energy; and an automatic voltage regulator configured to control power supplied to a field winding and to control output voltage of the generator body. The automatic voltage regulator is driven by a power supplier configured to supply constant voltage or current based on power storage and conversion. According to the present disclosure, the diesel generator may have a load capacity without a PMG.

3 Claims, 5 Drawing Sheets

DIESEL GENERATOR WITH IMPROVED LOAD CAPACITY

CROSS-REFERENCE TO RELATED APPLICATION

This application claims priority to and the benefit of Korean Patent Application No. 10-2019-0140774, filed in Korea on Nov. 6, 2020, the disclosure of which is incorporated herein by reference in its entirety.

TECHNICAL FIELD

Disclosed herein is a diesel generator with an improved load capacity, and, more particularly, a diesel generator having an improved load capacity without a permanent magnet generator (PMG).

BACKGROUND

Generators are devices that receive mechanical energy generated as a result of mechanical movements of an engine referred to as a motor, converts the mechanical energy into electric energy as a result a magnetic coupling between a stator and a rotor in the generator, and supplies power to a load connected to the generator.

The generator includes a stator and a rotor configured to generate power, an exciter configured to supply power to the rotor continuously, and an automatic voltage regulator (AVR) configured to output power at a predetermined level.

The generator can maintain constant voltage according to a self-excited method, i.e., in a way that the generator maintains constant voltage based on a voltage control loop through the automatic voltage regulator in a state where power is not supplied from the outside. In this case, the generator has to supply a minimum voltage to enable the automatic voltage regulator to operate. To this end, an exciter pole is manufactured using soft iron having a high remaining flux, and, when residual voltage generated in the generator is lower than a minimum input voltage of the automatic voltage regulator, the generator cannot operate correctly.

A diesel generator is a device I which a generator generating electric energy and a diesel engine are coupled.

The diesel generator is mainly installed as a non-commercial/emergency power source in factories or buildings, a power source for distribution on an island such as a remote island, and the like.

The diesel engine is most efficient among all the heat engines and it takes a short time for the diesel engine to start. Additionally, the diesel engine can include a small number of auxiliary installations, require a little space and be readily installed.

Additionally, the diesel generator reduces fuel loss before and after its operation and ensures efficiency even in a light load.

Heavy oils used for the diesel generator are less combustible, are less likely to go decay and produces no ashes.

The diesel generator can be readily managed, maintain efficiency despite a long-term use, and incur less repair expenses.

Thanks to the above advantages, the diesel generator can be used in an emergency, or commercially/usually.

The diesel generator of the related art supplies power to an automatic voltage regulator using a permanent magnet generator (PMG) to acquire a stable output.

To implement a diesel generator using a permanent magnet generator, a rotating shaft has to be individually designed, a longer manufacturing period can be needed, and components of the permanent magnet generator needs to be imported, thereby causing an increase in manufacturing costs.

When the diesel generator uses no permanent magnet generator to reduce the costs, a load capacity can be deteriorated, a response of an inductive load can be degraded, harmonic-frequency interference of a harmonic frequency generation load cannot be fundamentally blocked.

PRIOR ART DOCUMENT

Patent Document (Patent Document 1) Korean Patent No. 10-1817646 (published on Jan. 11, 2018)

SUMMARY

The present disclosure is directed to a diesel generator with an excellent load capacity that may improve a response of an inductive load and fundamentally block interference of harmonic frequencies of a harmonic-frequency generation load, without any permanent magnet generator.

The present disclosure is also directed to a diesel generator with an excellent load capacity that may be substitute for imported PMGs, require no change in the design of a rotating shaft, and ensure a shorter period of manufacturing.

According to the present disclosure, a diesel generator with an improved load capacity may include a generator body including a field magnet and an armature and configured to convert rotational energy of a diesel engine main body into electric energy, and an automatic voltage regulator configured to control power supplied to a field winding and to control output voltage of the generator body. The automatic voltage regulator may be driven by a power supplier configured to supply constant voltage or current based on power storage and conversion.

The power supplier may include an inverter configured to convert electric energy and output constant voltage or current.

The power supplier may include a charging generator configured to convert rotational energy of the diesel engine main body into power, and an inverter configured to convert power and output constant voltage or current.

The power supplier may include a starting battery configured to store power output by a charging generator configured to convert electric energy or rotational energy of the diesel engine main body into power, and an inverter configured to convert output energy of the battery and output constant voltage or current.

The power supplier may include a charging generator configured to convert rotational energy of the diesel engine main body into power, a starting battery configured to store electric energy or power, and an inverter configured to convert electric energy, power or output power of the starting battery and output constant voltage or current. The automatic voltage regulator is driven by at least one of power suppliers of the diesel generator body, the charging generator, and the starting battery.

The diesel generator with an improved load capacity may further include an operation panel configured to control switching for selecting at least one power supplier based on output of the diesel generator body, the charging generator, and the starting battery, to supply power needed to drive the automatic voltage regulator.

Details in relation to other embodiments are included in the section "Detailed Description" and the accompanying "Drawings".

Advantages and/or features according to the present disclosure, and a method for achieving the same can be clearly understood based on various embodiments that are specifically described with reference to the accompanying drawings.

However, the disclosure is not intended to limit the embodiments set forth herein. The embodiments in the disclosure may be implemented in various different forms and are provided as examples so that the present disclosure can be thorough and complete and fully convey the subject matter in the present disclosure to one having ordinary skill in the art to which the disclosure pertains. The present disclosure should be defined by the scope of the appended claims.

According to the present disclosure, an excellent load capacity may be ensured, a response of an inductive load may be improved, interference of harmonic frequencies of a harmonic-frequency generation load may be fundamentally blocked, imported PMGs may be replaced, no change in the design of the rotating shaft is required, and a shorter period of manufacturing may be ensured, without any permanent magnet generator.

Additionally, input voltage may be supplied to an automatic voltage regulator using various types of power suppliers.

Further, power supplied to the automatic voltage regulator may be selected as a result of control of switching in selecting a power supplier depending on an output state of various types of power suppliers.

BRIEF DESCRIPTION OF DRAWINGS

The accompanying drawings constitute a part of this specification, illustrate one or more embodiments of the present disclosure, and together with the specification, explain the present disclosure, wherein.

DETAILED DESCRIPTION

Figure 1:
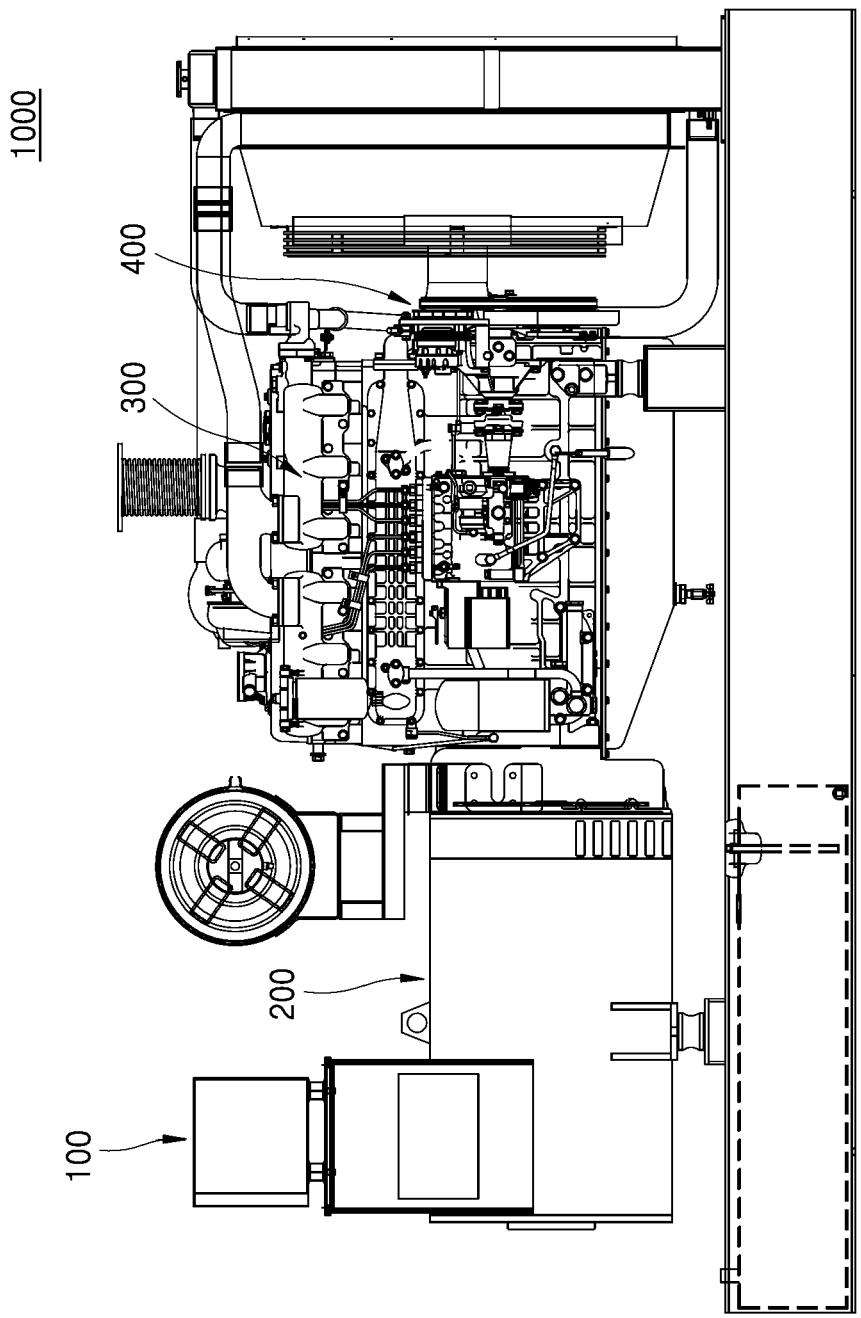
FIG. 1 is a block diagram showing an example generator with an improved load capacity.

Throughout the present disclosure, all the terms and words used herein should not be limited and interpreted as having the same meaning as those commonly used and defined in dictionaries, and may be properly used for description and to convey their concept in the best possible way. Additionally, the terms and words should be interpreted as having a meaning and concept that are consistent with their meaning and concept commensurate with the technical spirit in the disclosure.

That is, the terms and words are used only to describe preferred embodiments according to the disclosure and not intended to limit details in the disclosure. The terms and words are defined considering various functions presented in the disclosure.

Throughout the disclosure, the singular forms "a", "an" and "the" are intended to include the plural forms as well, unless explicitly indicated otherwise. Similarly, the plural forms may be interpreted as including the singular forms.

Throughout the disclosure, when any one component comprises another component, the term "comprise" should imply the inclusion of another component but not the exclusion of another component, unless explicitly described to the contrary.

Further, when any one component is "disposed in" another component, or "connected to" another component, any one component may be directly connected to another component or contact another component, or may be spaced a predetermined distance apart from another component. When any one component is spaced a predetermined distance apart from another component, any one component may be fixed or connected to another component by an additional component or means. The additional component or means may be omitted during description.

When any one component is "directly connected", or "directly coupled" to another component, any one component may be "connected", or "coupled" to another component without an additional component or means.

Similarly, other expressions used to describe relationships among components such as "between" and "right between", or "adjacent to" and "directly adjacent to" should be interpreted as described above.

Throughout the disclosure, the terms "one surface", "the other surface", "one side", "the other side", "first", "second" and the like are used only to distinguish one component from another component, but not intended to limit the meaning of the components.

The terms "up", "down", "left", "right" and the like used herein may indicate a relative position of a component in a drawing relevant to the component. A position of a component does not denote an absolute position unless the absolute position of the component is specified.

Further, like components in drawings may be given like reference numerals although they are illustrated in different drawings. That is, throughout the disclosure, like reference numerals may denote like components.

In the accompanying drawings of the disclosure, sizes, positions, coupling relationships and the like of the components may be partially exaggerated or reduced or omitted for the sake of convenience and clarity in description of the subject matter of the disclosure. Thus, proportions and scales of the components may not be strict.

During description, well-known configurations, e.g., well-known technologies including the related arts are not described if they are deemed to make the gist of the disclosure unnecessarily vague.

Below, embodiments according to the present disclosure are described with reference to accompanying drawings.

FIG. 1 is a block diagram showing an example diesel generator with an improved load capacity.

Referring to FIG. 1, the diesel generator 1000 with an improved load capacity may include an operation panel 100, a diesel generator body 200, and a diesel engine main body 300.

The diesel generator 1000 is a device in which the diesel generator body 200 configured to generate electric energy, and the diesel engine main body 300 corresponding to a diesel engine share a single rotating shaft and connect with each other.

The diesel generator 1000 may be mainly installed as a non-commercial/emergency power source or a commercial/usual power source in factories or buildings, a power source for distribution on an island, e.g., a remote island, and the like.

The diesel generator body 200 may generate electricity, and the diesel engine main body 300 may drive the diesel generator body 200. The operation panel 100 may serve as a controller configured to control the diesel generator body 200.

The diesel engine main body 300 may produce a rotational power using diesel fuel.

Additionally, the diesel generator body 200 may receive a rotational power from the diesel engine and convert the same into electric energy.

The diesel generator body 200 may include various types of electronic components including a body housing in which a field magnet and an armature are installed.

That is, the diesel generator body 200, configured to convert a rotational power into electric energy, may be provided with an armature and a field magnet, i.e., a stator and a rotor, for generating an induced electromotive force.

The stator may be formed in a way that a plurality of circular plate-shaped stator cores is stacked lengthways on an inner surface of the body.

The rotor may be formed in a way that a plurality of rotor cores is stacked lengthways.

Further, the body housing of the diesel generator may have difference sizes. An ordinary body housing may have a diameter of 1 m to 15 m and a length of 15 m to 25 m.

The diesel generator with an improved load capacity 1000 may include a charging generator 400 and a starting battery 700 for driving the diesel engine main body 300.

The charging generator 400 may be a three-phase alternating synchronous generator provided with a solid state, a rectifier and a regulator therein.

The charging generator 400 may be driven by the diesel engine main body 300.

An AC power source may be rectified into a DC power source by the rectifier.

A battery of a vehicle, including the diesel engine, may be generally referred to as a resin battery or a secondary battery.

For example, the battery may drive a starting motor when the vehicle starts, and supply a standby power source when the generator is out of order.

An example starting battery 700 may be a component that serves as a power source of various types of control systems for starting an ignition as well as a starting power source. The starting battery 700 is considered to be an important component for an engine.

In the structure, a positive (+) electrode plate and a negative (−) electrode plate are disposed in a plastic container, and a cell precipitated in an electrolyte is combined.

For the positive electrode plate, a lead-based alloy substrate is filled with lead peroxide in a sponge shape, and for the negative electrode plate, a lead-based alloy substrate is filled with lead in a sponge shape, such that the lead peroxide and the lead easily dissolve in the electrolyte.

When positive and negative terminals are connected with an electric circuit therebetween, the lead peroxide and the lead may chemically react with sulfuric acid and changed into lead sulfate, and an amount of water in the electrolyte may increase.

The above process may be referred to as discharge. When the discharge continues for a long period of time, the electrolyte may be close to water and may not generate electricity.

Inverters may be electric devices for converting DC or AC into different magnitudes and frequencies of AC. An inverter in a generator of the related art may be mainly used to convert output voltage and current of the generator. An example inverter 500 may perform a function of outputting power having constant voltage and current values supplied to an automatic voltage regulator 600 in addition to the function of the inverter of the related art. A source power input to the inverter 500 may include power generated by the diesel generator body 200 or the charging generator 400, and power where the power generated by the diesel generator body 200 or the charging generator 400 is stored in the starting battery 700 using the rectifier and a charging circuit.

The example inverter 500 may output a desired voltage and frequency according to a proper conversion method, or through a switching element or a control circuit.

The inverter 500 may collectively denote an AC source-type outputting converter among power converters used to use a specific power source (a voltage source, a current source, a frequency, magnitude, a direction, for example) as a power source having different ingredients.

The example automatic voltage regulator 600 may be driven using AC, converted by the inverter 500, as driving power, and may maintain output voltage of the diesel generator body.

The automatic voltage regulator 600 may compare input voltage with a predetermined reference voltage and compensate a difference between the input voltage and the reference voltage to automatically maintain output voltage of the diesel generator body 200 at a predetermined value. The output voltage may be changed depending on a setup.

An automatic voltage regulator may be included in an AC generator, a DC generator and a constant voltage rectifier as a component, or may be an external independent device that provides a function to the AC generator, the DC generator and the constant voltage rectifier.

The automatic voltage regulator 600 may be included in the diesel generator body 200 or the charging generator 400 or may be disposed outside the diesel generator body 200 or the charging generator 400.

The example diesel generator 1000 with an improved load capacity may detect a change in terminal voltage, caused by a change in loads, speed and the like, and may control magnetic field current.

The diesel generator 1000 with an improved load capacity may include an automatic voltage regulator 600 configured to stably output voltage.

The automatic voltage regulator 600 may compare a reference voltage and output voltage and compensate a difference between the reference voltage and the output voltage such that the output voltage is converged in the reference voltage.

The example diesel generator 1000 with an improved load capacity may include a component substituted for an existing PMG. That is, the example automatic voltage regulator 600 may be driven by various types of power suppliers that may be substituted for the PMG.

The example automatic voltage regulator 600 may be driven by a power supplier configured to supply constant voltage or current based on storage and conversion of power.

Figure 2:
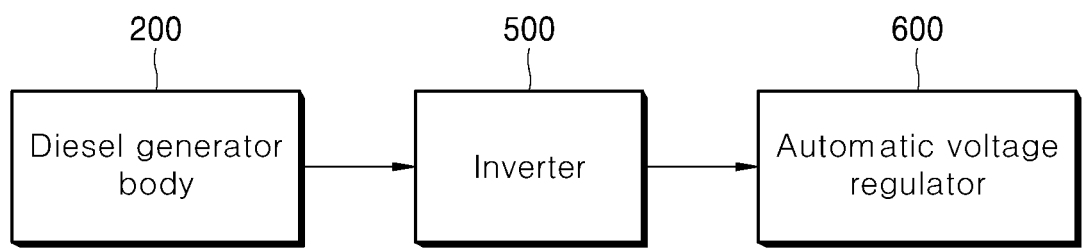
FIG. 2 is a block diagram showing a power supplier of an example automatic voltage regulator.

FIG. 2 is a block diagram showing a power supplier of an example automatic voltage regulator.

Referring to FIG. 2, the power supplier of the automatic voltage regulator 600 may include an inverter 500 configured to convert electric energy and output constant voltage or current. Power output from the diesel generator body 200 may be input to the inverter 500, and the inverter 500 may convert the power to output constant voltage or current of power for driving the automatic voltage regulator 600. A PMG of the related art may be used to output constant voltage. The example inverter 500 may output constant voltage like the PMG. When output voltage of the diesel generator body 200 is unstable due to an overload, the inverter 500 may convert the unstable output voltage into constant voltage.

Figure 3:
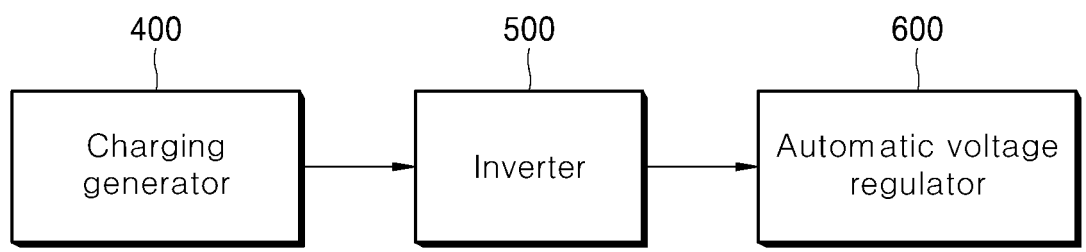
FIG. 3 is a block diagram showing a power supplier of an example automatic voltage regulator.

FIG. 3 is a block diagram showing a power supplier of an example automatic voltage regulator.

Referring to FIG. 3, the power supplier of the automatic voltage regulator 600 may include an inverter 500 configured to convert electric energy and output constant voltage or current. Power output from the charging generator 400 may be input to the inverter 500, and the inverter 500 may convert the power to output constant voltage or current of power for driving the automatic voltage regulator 600. A PMG of the related art may be used to output constant voltage. The example inverter 500 may output constant voltage like the PMG. When output voltage of the charging generator 400 is unstable due to an overload, the inverter 500 may convert the unstable output voltage into constant voltage.

Figure 4:
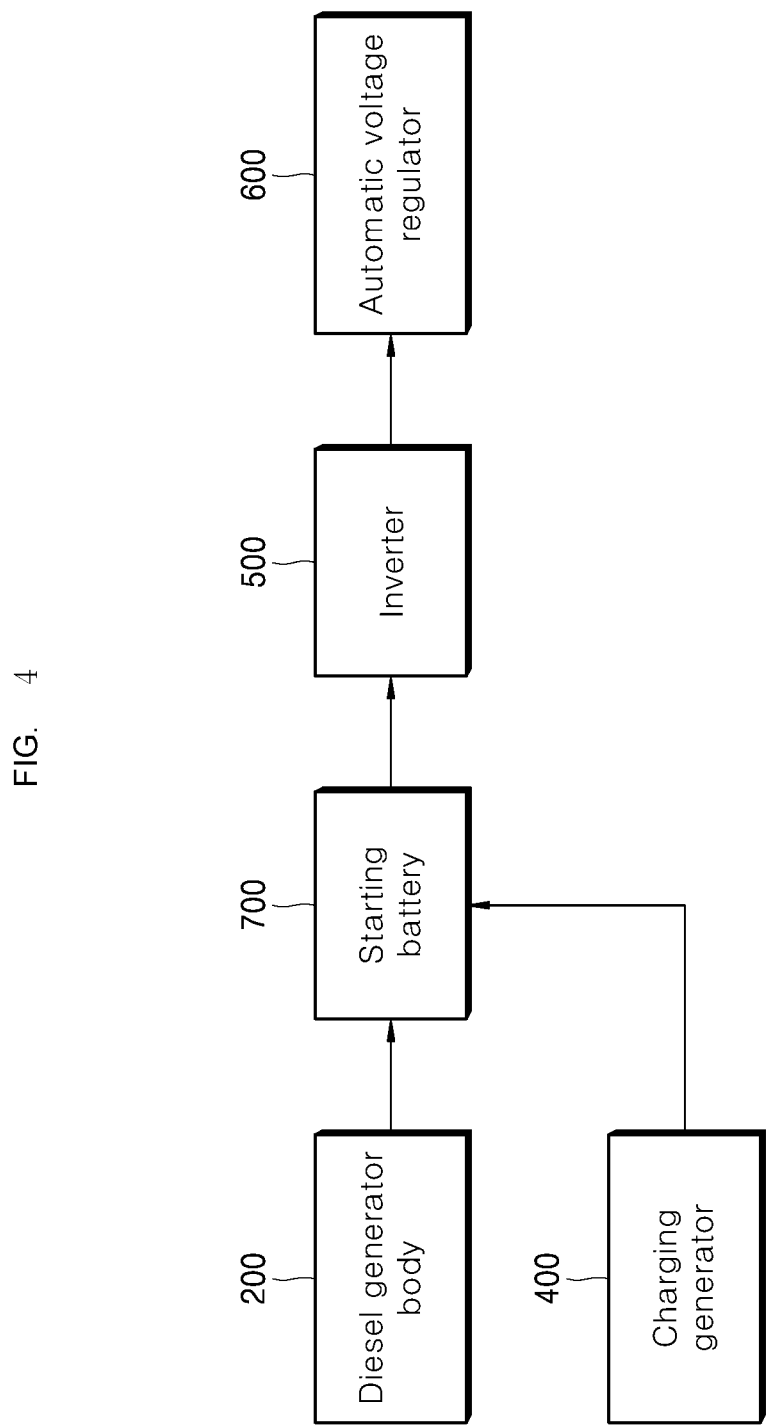
FIG. 4 is a block diagram showing a power supplier of an example automatic voltage regulator.

FIG. 4 is a block diagram showing a power supplier of an example automatic voltage regulator.

Referring to FIG. 4, the power supplier of the automatic voltage regulator 600 may include a starting battery 700 configured to store power and an inverter 500 configured to convert discharged power and output constant voltage or current. Power output from at least one of the diesel generator body 200 and the charging generator 400 may be put into the starting battery 700, the power put into the starting battery 700 may flow out and be input to the inverter 500, and the inverter 500 may convert the input power to output constant voltage or current of power for driving the automatic voltage regulator 600. A PMG of the related art may be used to output constant voltage. The example starting battery 700 and the example inverter 500 may output constant voltage like the PMG. When output voltage of the diesel generator body 200 and the charging generator 400 is unstable due to an overload, the starting battery 700 may store rectified power, power flowing out from the starting battery 700 may be input to the inverter 500, and the inverter 500 may convert the input DC power into constant AC voltage and current.

Figure 5:
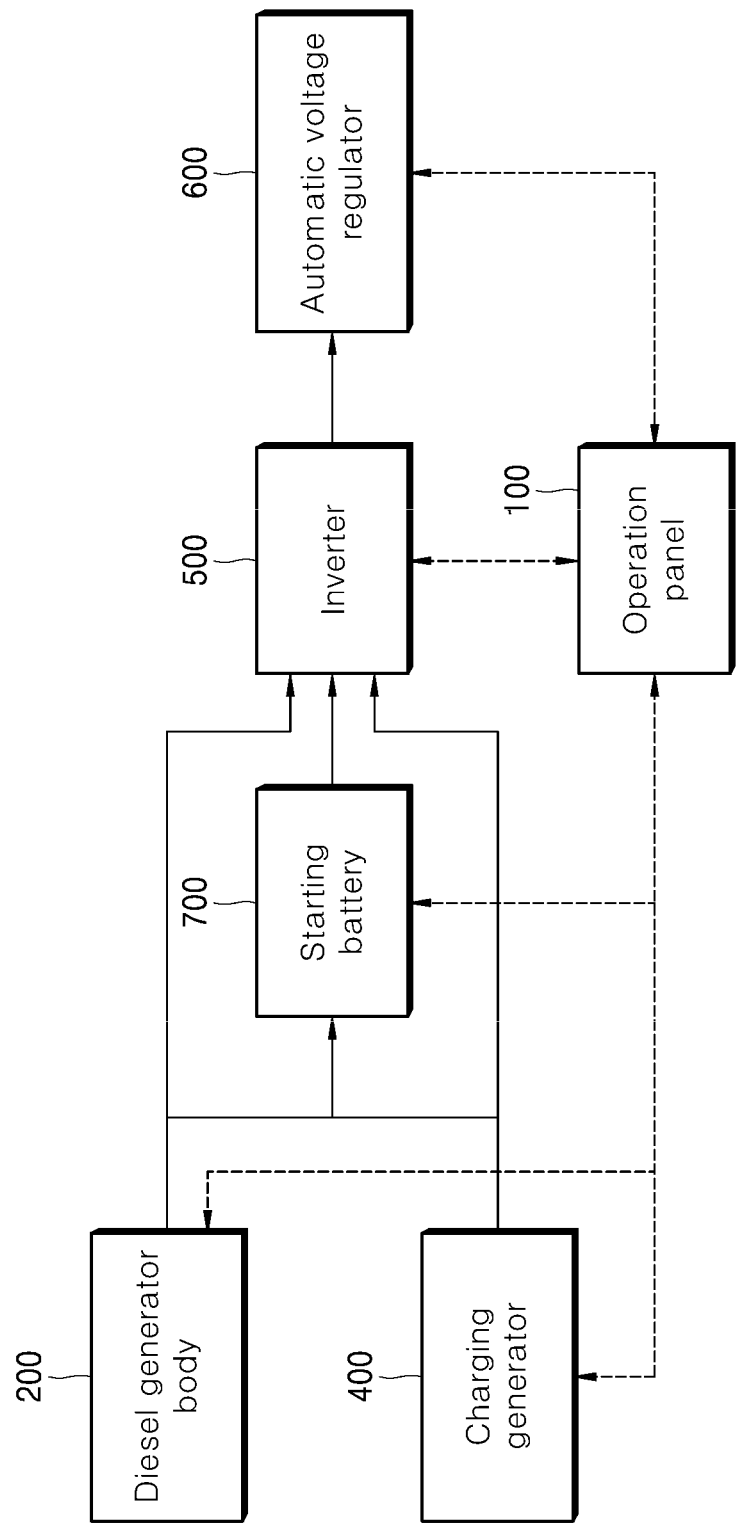
FIG. 5 is a block diagram showing a power supplier of an example automatic voltage regulator and an example operation panel configured to control the power supplier and the automatic voltage regulator.

FIG. 5 is a block diagram showing a power supplier of an example automatic voltage regulator, and an operation panel configured to control the power supplier and the automatic voltage regulator.

FIG. 5 shows a diesel generator body 200 and a charging generator 400 corresponding to a power source, a starting battery 700 configured to store generated electricity, an automatic voltage regulator configured to convert AC and DC power into constant AC voltage and current, and an operation panel 100 configured to control operations thereof.

A power supplier of the automatic voltage regulator 600 may include a starting battery 700 configured to store power, and an inverter 500 configured to convert power generated and flowing out and to output constant voltage or current. Power output from at least one of the diesel generator body 200 and the charging generator 400 may be directly input to the inverter 500 or may be put into the starting battery 700, the power put into the starting battery 700 may flow out and be input to the inverter 500, and the inverter 500 may convert the power put into the inverter 500 and may output constant voltage or current of power for driving the automatic voltage regulator 600. A PMG of the related art may be used to output constant voltage. The example starting battery 700 and the example inverter 500 may output constant voltage like the PMG. When output voltage of the diesel generator body 200 and the charging generator 400 is unstable due to an overload, the starting battery 700 may store rectified power, power flowing out from the starting battery 700 may be input to the inverter 500, and the inverter 500 may convert the DC power, input as a result of the discharge in the starting battery, or power of the power source into constant AC voltage and current.

The operation panel 100 may correspond to a controller of the example diesel generator with an improved load capacity. The operation panel 100 may control switching for selecting at least one power supplier based on output of the diesel generator body, the charging generator and the starting battery, to supply power for driving the automatic voltage regulator 600.

For example, the operation panel 100 may select at least one of the diesel generator body 200 and the charging generator 400 as a power source based on control. The operation panel 100 may charge the starting battery 700 using the power source selected based on control. In the state in which the battery 700 is charged, the operation panel 100 may control operations of the inverter 500 such that power of the power source is supplied to the automatic voltage regulator 600 through the inverter 500. When detecting a shortage of the power of the power source, the operation panel 100 may control operations of the starting battery 700 and the inverter 500 such that power stored in the starting battery 700 flows out and is supplied to the automatic voltage regulator 600 through the inverter 500. Additionally, when the power source normally supplies power, the operation panel 100 may control a charge process of the starting battery 700 to charge the starting battery 700.

Referring back to FIGS. 2 to 5, for the example automatic voltage regulator 600, power generated by the diesel generator body 200 may be converted by the inverter 500. The example automatic voltage regulator 600 may be driven using output voltage of the inverter 500.

The charging generator 400 and the starting battery 700 driven by the diesel engine main body 300 may generate power individually or in cooperation with each other.

That is, the charging generator 400 may generate power independently, and the power by the charging generator 400 may be stored in the starting battery 700 through the rectifier and the charging circuit. That is, the charging generator 400 and the starting battery 700 may generate power in cooperation with each other.

For example, the charging generator 400 and the starting battery 700 may generate 24V DC. In this case, an output current may be 45 A but not limited. The charging generator 400 and the starting battery 700 may output different magnitudes of current and voltage.

As described above, AC power output by the charging generator 400 and DC power flowing out from the starting battery 700 may be inverter by the inverter 500 and converter into AC power.

For example, the example inverter 500 may convert 24V DC of input DC voltage into 220 V of AC voltage. In this case, an output amount of the inverter 500 may be 1 kW but not limited. The inverter 500 may output different magnitudes of power.

The automatic voltage regulator 600 may be driven by the AC voltage converted as described above.

For example, the automatic voltage regulator 600 may be driven by implementing sine waves using the AC voltage (220V, 60 Hz) but not limited. Apparently, the automatic voltage regulator 600 may be driven using various constant voltages.

A diesel generator of the related art uses a permanent magnet generator (PMG) to drive an automatic voltage regulator.

For the example diesel generator 1000, the charging generator 400 or the inverter 500, driven by the diesel engine main body 300, may generate direct current, the generated direct current may be inverted by the inverter 500 and converted into alternating current, and the automatic voltage regulator 600 may be driven using the alternating current converted, thereby enabling the diesel generator to serve as a permanent magnet generator without a permanent magnet generator.

According to one embodiment, the diesel generator may have an excellent load capacity, improve a response of an inductive load, fundamentally block interference of harmonic frequencies of a harmonic-frequency generation load, be substitute for imported PMGs, require no change in the design of the rotating shaft, and ensure a shorter period of manufacturing, without any permanent magnet generator.

Additionally, the diesel generator may supply input voltage to the automatic voltage regulator using various types of power suppliers.

Further, the diesel generator may select power supplied to the automatic voltage regulator as a result of switching control in selecting a power supplier depending on an output state of various types of power suppliers.

The embodiments have been described with reference to a number of illustrative embodiments thereof. However, the embodiments in the present disclosure may be provided only as examples, and numerous other modifications and equivalents may be made by one having ordinary skill in the art to which the disclosure pertains from the above description.

The embodiments may be implemented in various different forms. The present disclosure is not intended to limit the embodiments, and the embodiments are provided as examples so that the disclosure will be thorough and complete and will fully convey the subject matter of the disclosure to one having ordinary skill in the art. The scope of the disclosure should be defined by the appended claims.

DESCRIPTION OF SYMBOLS

100: Operation panel
200: Diesel generator body
300: Diesel engine main body
400: Charging generator
500: Inverter
600: Automatic voltage regulator
700: Starting battery.

What is claimed is:

1. A diesel generator with an improved load capacity, comprising:
   a diesel generator body including a field magnet and an armature, and configured to convert rotational energy of a diesel engine main body into electric energy;
   a charging generator configured to be driven by the diesel engine main body and convert the rotational energy of the diesel generator into power;
   a starting battery configured to be charged with electric energy converted by the diesel generator body or power converted by the charging generator;
   an inverter configured to convert output power of the diesel generator body or the charging generator, or convert output power discharged from the starting battery, and output rated voltage or current; and
   an automatic voltage regulator configured to be driven by alternating current (AC) converted by the inverter and control output voltage of the diesel generator body,
   wherein the automatic voltage regulator is driven by one of the diesel generator body, the charging generator, and the starting battery, and
   wherein, when output voltage of the diesel generator body or the charging generator is unstable due to an overload, power discharged from the starting battery is input to the inverter.

2. The diesel generator of claim 1, further comprising:
   an operation panel configured to control switching for selecting one based on output of the diesel generator body, the charging generator, or the starting battery, to supply power needed to drive the automatic voltage regulator.

3. The diesel generator of claim 1, wherein the charging generator and the starting battery generate power individually or in cooperation with each other.

* * * * *